(12) United States Patent
Liu et al.

(10) Patent No.: US 7,203,708 B2
(45) Date of Patent: Apr. 10, 2007

(54) OPTIMIZING FILE REPLICATION USING BINARY COMPARISONS

(75) Inventors: Hai Liu, Redmond, WA (US); Lauren Antonoff, Seattle, WA (US)

(73) Assignee: Microsoft Corporation, Redmond, WA (US)

(\*) Notice: Subject to any disclaimer, the term of this patent is extended or adjusted under 35 U.S.C. 154(b) by 473 days.

(21) Appl. No.: 10/702,863

(22) Filed: Nov. 6, 2003

(65) Prior Publication Data

US 2005/0102288 A1 May 12, 2005

(51) Int. Cl.
*G06F 17/30* (2006.01)
(52) U.S. Cl. .................. 707/200; 707/10; 707/203; 709/219; 711/168
(58) Field of Classification Search .......... 707/1–10, 707/100–104.1, 200–206; 715/500.1, 513; 709/217, 219, 248–250; 711/168
See application file for complete search history.

(56) References Cited

U.S. PATENT DOCUMENTS

| | | | | |
|---|---|---|---|---|
| 5,859,971 | A * | 1/1999 | Bittinger et al. | 709/203 |
| 6,434,683 | B1 * | 8/2002 | West et al. | 711/162 |
| 6,499,031 | B1 | 12/2002 | Hopmann et al. | 707/8 |
| 6,578,054 | B1 | 6/2003 | Hopmann et al. | 707/201 |
| 6,578,069 | B1 | 6/2003 | Hopmann et al. | 709/203 |
| 6,671,757 | B1 * | 12/2003 | Multer et al. | 710/100 |
| 6,847,983 | B2 * | 1/2005 | Somalwar et al. | 707/203 |
| 6,985,915 | B2 * | 1/2006 | Somalwar et al. | 707/203 |

OTHER PUBLICATIONS

Chan et al., Incremental Update to Aggregated Infromation for data Warehouse over Internet, ACM, 2000, 57-64.*
Burns, R.C. et al., "Consistency and Locking for Distributing Updates to Web Servers Using a File System", *ACM Sigmetrics Performance Evaluation Review*, 2000, 28(2), 15-21.
Coppieters, K., "A Cross-Platform Binary Diff," *Dr. Dobb's Journal*, May 1995, pp. 1-4.
Gifford, D.K. et al., "The Cedar File System", *Communications of the ACM*, 1988, 31(3), 288-298.
Levy, E. et al., "Distributed File Systems: Concepts and Examples", *ACM Computing Surveys*, Dec. 1990, 22(4), 321-374.
Mann, T. et al., "A Coherent Distributed File Cache with Directory Write-Behind", *ACM Transactions on Computer Systems*, 1994, 12(2), 123-164.
Muthitacharoen, A. et al., "A Low-bandwidth Network File System", *ACM SIGops Operating Systems Review, Proceedings of the 18th ACM Symposium on Operating Systems Principles*, 2001, 35(5), 174-187.
Noe, J.D. et al., "Replication in Distributed Systems: The Eden Experience", *IEEE Proceedings of 1986 Fall Joint Computer Conference*, 1999, 1197-1209.
Svobodova, L., "File Servers for Network-Based Distributed Systems", *Computing Surveys*, 1984, 16(4), 353-398.

\* cited by examiner

*Primary Examiner*—Shahid Alam
*Assistant Examiner*—Jean Bolte Fleurantin
(74) *Attorney, Agent, or Firm*—Woodcock Washburn LLP

(57) ABSTRACT

Client and server based copies of a file are maintained in synchronicity as changes are made to the file. Data is compared to a previous version known to both the client and server and a highly compressed representation of the differences between the two is generated. These differences, or "diffs", are then transmitted, and may use extensions to the HTTP (HyperText Transport Protocol) protocol.

24 Claims, 6 Drawing Sheets

OPTIMIZING FILE REPLICATION USING BINARY COMPARISONS

FIELD OF THE INVENTION

This invention relates in general to the field of computer file replication. More particularly, this invention relates to file replication using binary comparisons.

BACKGROUND OF THE INVENTION

Replication enables both local and remote access to data by keeping client and server versions of a file or document in synchronicity. While this functionality is valuable and critical to applications, it is also costly due to the amount of data that must be transmitted between the clients and the server. Entire files and documents, along with their various versions, are stored at the server, and transmitted between the server and its clients. As such, many replication systems attempt to save bandwidth by compressing data before transmitting it. However, this traditional form of compression encodes the data for the entire file, even if the majority of this data was transmitted as part of a previous version. Thus, minor changes to the data in a file or document still require the entire file or document to be compressed and transmitted, although much of the data already resides at the destination, in the form of an earlier received version.

In view of the foregoing, there is a need for systems and methods that overcome the limitations and drawbacks of the prior art.

SUMMARY OF THE INVENTION

The present invention provides a mechanism for maintaining client and server based copies of a file in synchronicity as changes are made to the file. Data is compared to a previous version known to both the client and server and a highly compressed representation of the differences between the two is generated.

According to one embodiment, a first copy and a second copy of a base file are received and stored at a client. The two copies are identical—the client receives one copy and saves two instances of that copy. The client then makes changes to the first copy and a difference (such as a binary difference) is determined between the changed first copy and the second copy. The difference is transmitted to a server that maintains the base file. The server accepts the difference if the base file at the server is the same as the base file that was stored at the first device; otherwise the server rejects the difference.

According to aspects of the invention, if the difference is rejected at the server, then the server transmits a second difference to the client. The client then applies the second difference to the second copy of the base file stored at the first device. This brings the client's base file up to date with respect to the base file that resides at the server. The client can then make changes to this updated base file, generate a new difference, and transmit the new difference to the server.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention is directed to maintaining the local (also referred to herein as "client") and server based copies of a file in synchronicity as changes are made to the file. The exemplary systems and methods described herein are more efficient than current techniques and keeps both the bandwidth requirements and the time element of performing the synchronization to a minimum.

Data is compared to a previous version known to both the client and server and a highly compressed representation of the differences between the two is generated. These differences, or "diffs", are then transmitted, and may use extensions to the HTTP (HyperText Transport Protocol) protocol.

Exemplary Computing Environment

Figure 1:
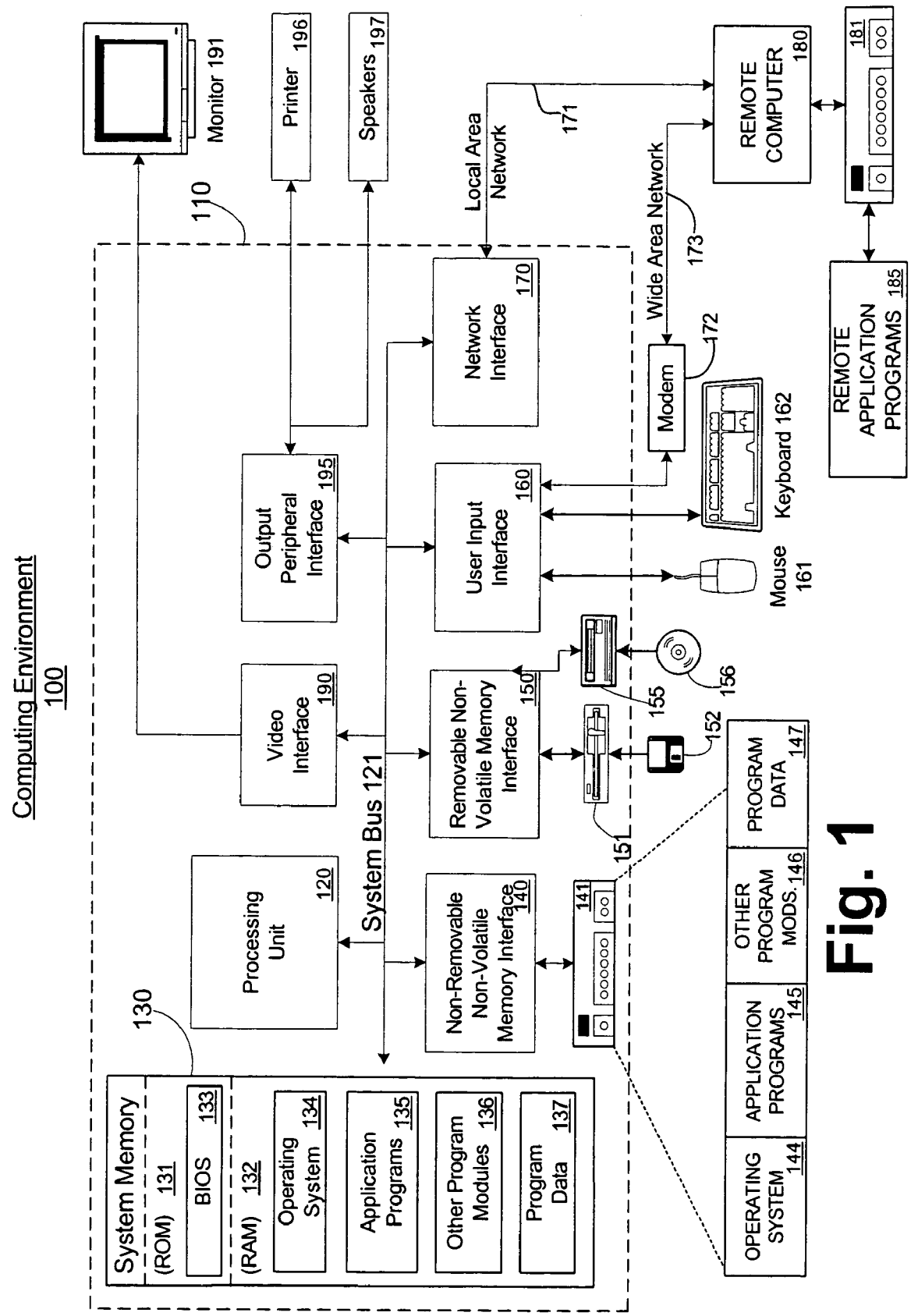
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, Microsoft®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Microsoft® Office®, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of .NET's languages and services, and in other distributed computing frameworks as well.

Exemplary Embodiments

Figure 2:
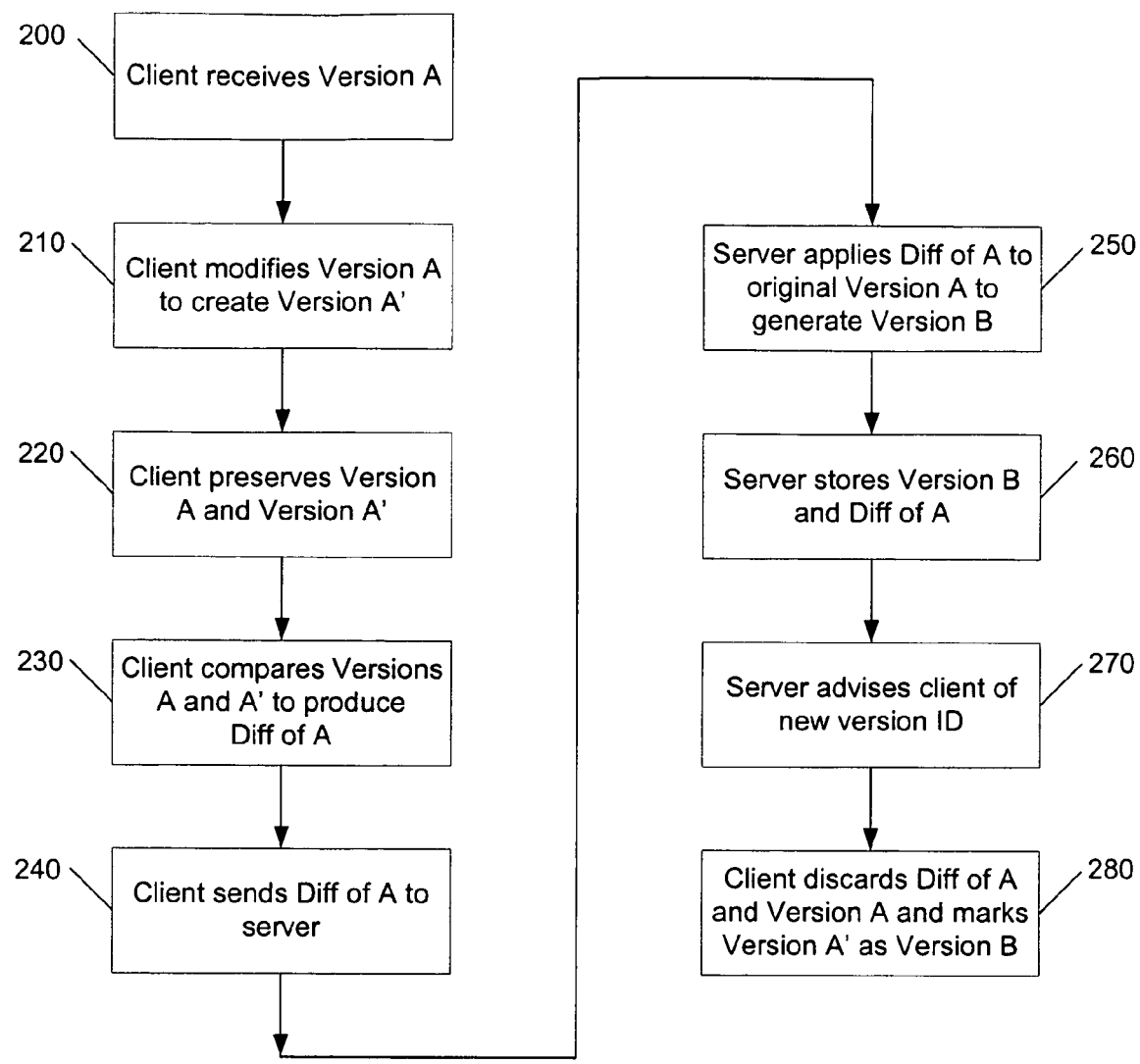
FIG. 2 is a flow diagram of an exemplary method of maintaining an updated file in accordance with the present invention.

FIG. 2 is a flow diagram of an exemplary method of maintaining an updated file in accordance with the present invention. In this exemplary embodiment, a client modifies a file and uploads the changes to a server. At step 200, the client receives a copy of the latest version ("Version A") of the base file that is stored at the server. The client makes its changes to Version A to create a Version A', at step 210. At step 220, the client saves a copy of the original Version A and the new Version A'. Thus, the client maintains a copy of the last known server state, even if the user updates the file. It is contemplated that a copy of Version A can be stored at the client either before step 210 or after step 210.

A difference, or "diff", is then produced at step 230 by comparing Versions A and A'. A diff is a mechanism by which two versions of a file are compared to generate a compressed diff that can be applied to the older file to generate the newer one. The differencing may be performed by any method, technique, or system known to those of skill in the art for determining the difference between a base form and a modified form. A preferred difference that is generated is a binary difference. The file is considered to be a series of bytes. A conventional compression algorithm is used to generate the binary difference by calculating the difference between the shadow or base copy and the copy as amended. This difference is then sent to the server, where it is rejected or accepted. A rejection will occur if the base on the server has changed, in which case the difference is of no use to the server. It is contemplated that any difference engine or technique can be used in accordance with the present invention. The use of a binary difference technique is provided herein for exemplary purposes.

In particular, at step 240, the client sends the diff to the server. The server, after checking to be sure that its latest version of the base file has not changed from the Version A that the client used in making the modification, applies the diff to Version A to generate a new, latest version of the file, Version B, at step 250. The checking of versions performed by the server is described further below with respect to FIGS. 3–6.

The server stores the new Version B as well as the client-provided diff (optional), at step 260. The new Version B is considered to be the latest update of the base file, and the diff is retained for use by other clients who may be making changes to the original Version A, as described further below with respect to FIGS. 3–6. The server optionally stores the diff in order to provide other clients with an optimized update. If multiple revisions are made, multiple diffs may be needed to get from an older version to the newest one. It is noted that the diff may also be useful for clients who are not intent to make changes, but instead want to read the latest Version B and already have Version A.

At step 270, the server advises the client of the new version identifier (e.g., "Version B"). The client then discards the diff that it had determined in step 230 as well as the Version A it had stored, and the client marks its Version A' with the new version identifier, at step 280. Thus, the client renames Version A' as Version B.

Figure 3:
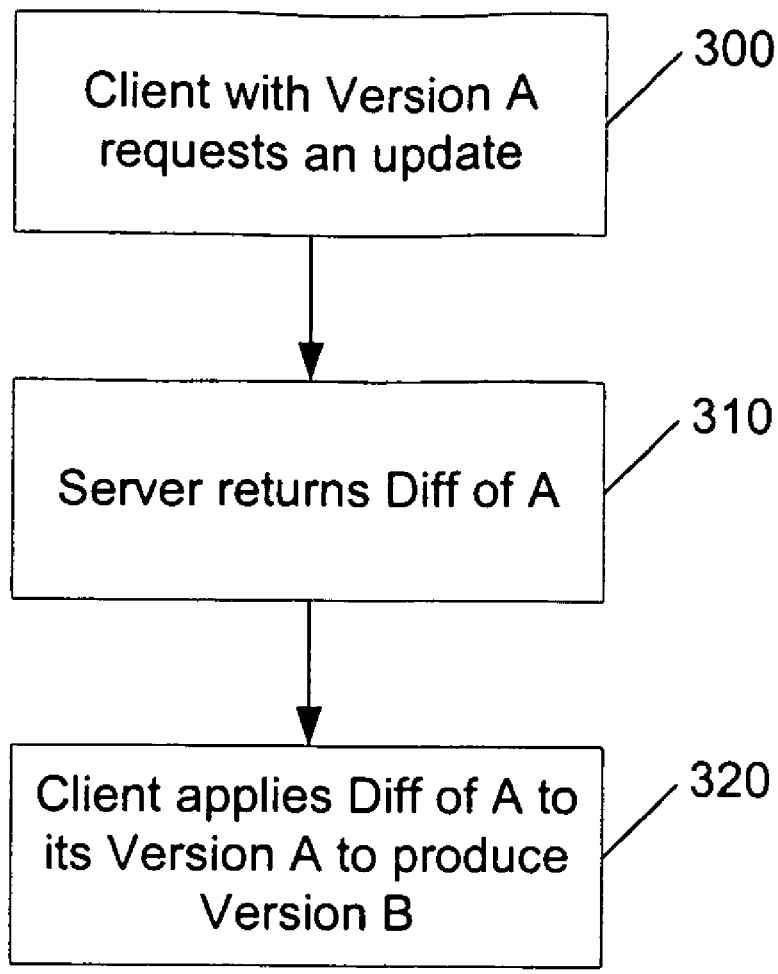
FIG. 3 is a flow diagram of another exemplary method of maintaining an updated file in accordance with the present invention.

FIG. 3 is a flow diagram of another exemplary method of maintaining an updated file. In this example, a server provides a client with the latest changes in the form of a diff file. At step 300, a client having Version A of a file requests an update of the file. A client might make such a request, for example, because the client desires to make changes to the latest version of the file. The client advises the server that the client has Version A, and in response, the server returns the diff of A, at step 310. The server may have been maintaining the diff of A from a previous client update (e.g., step 260 in FIG. 2). At step 320, the client applies the diff of A to its stored Version A to produce the latest version of the file (e.g., "Version B").

Figure 4:
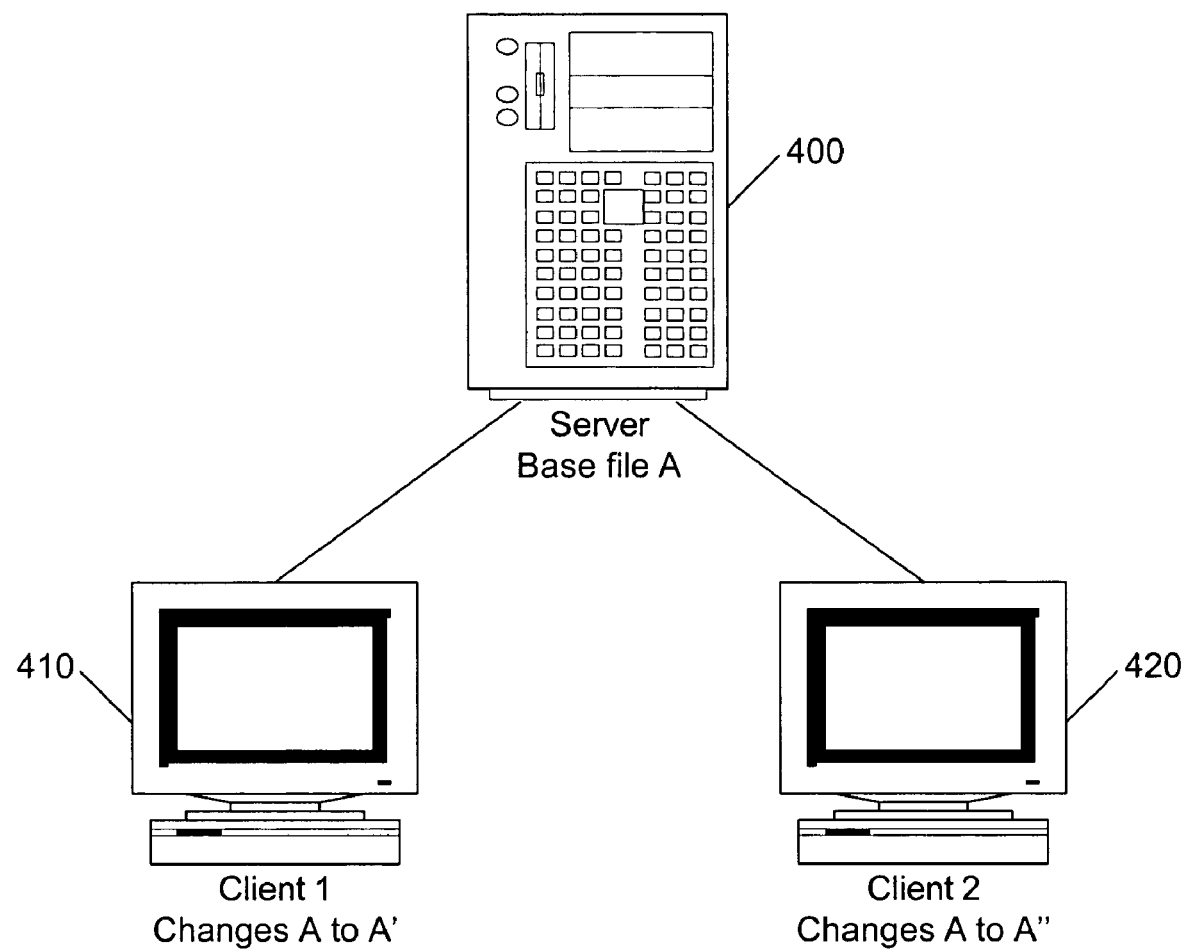
FIG. 4 shows a block diagram of an exemplary system that is helpful in describing aspects of the present invention.
Figure 5:
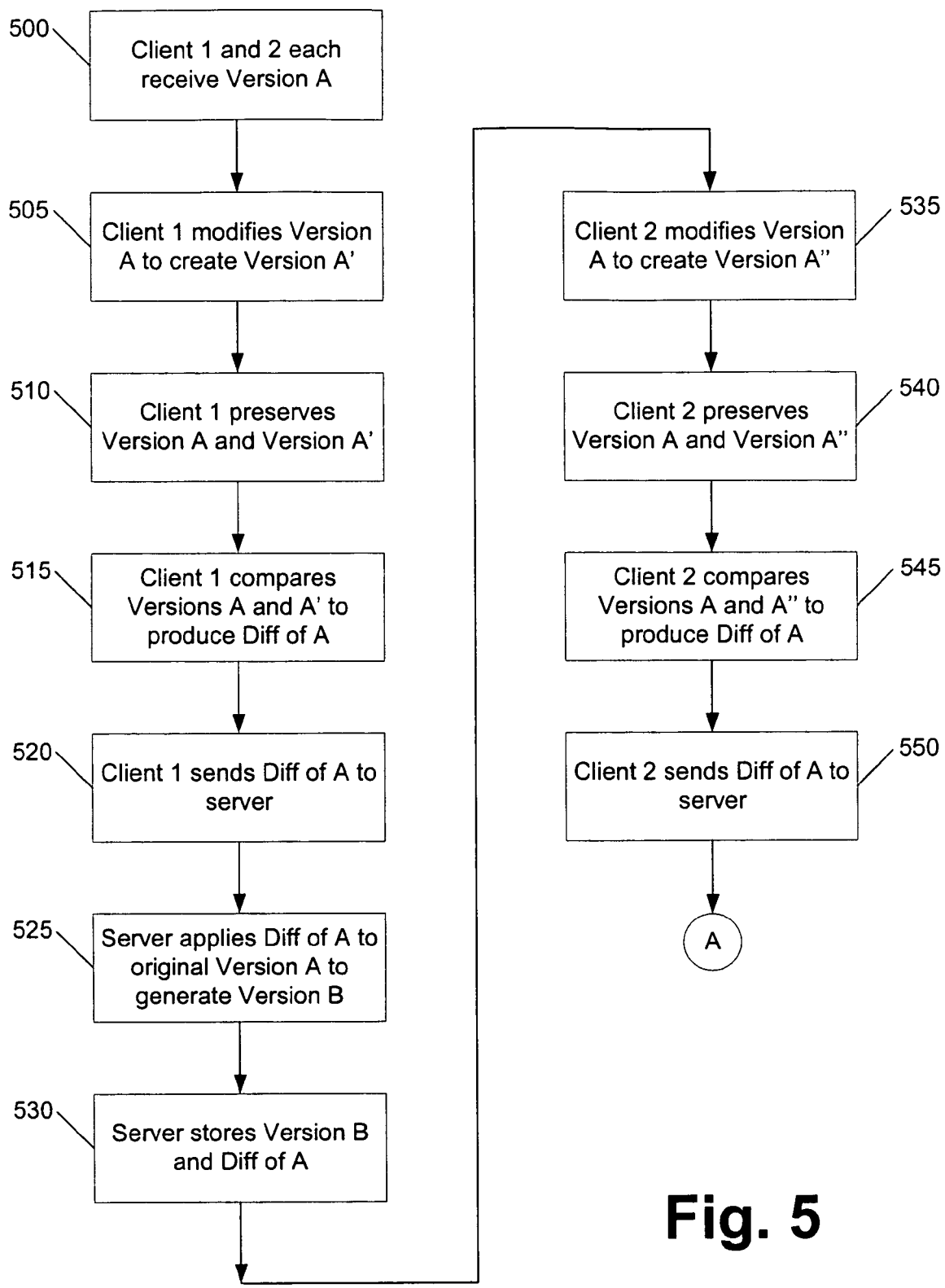
FIGS. 5 and 6 are flow diagrams of another exemplary method of maintaining an updated file in accordance with the present invention.
Figure 6:
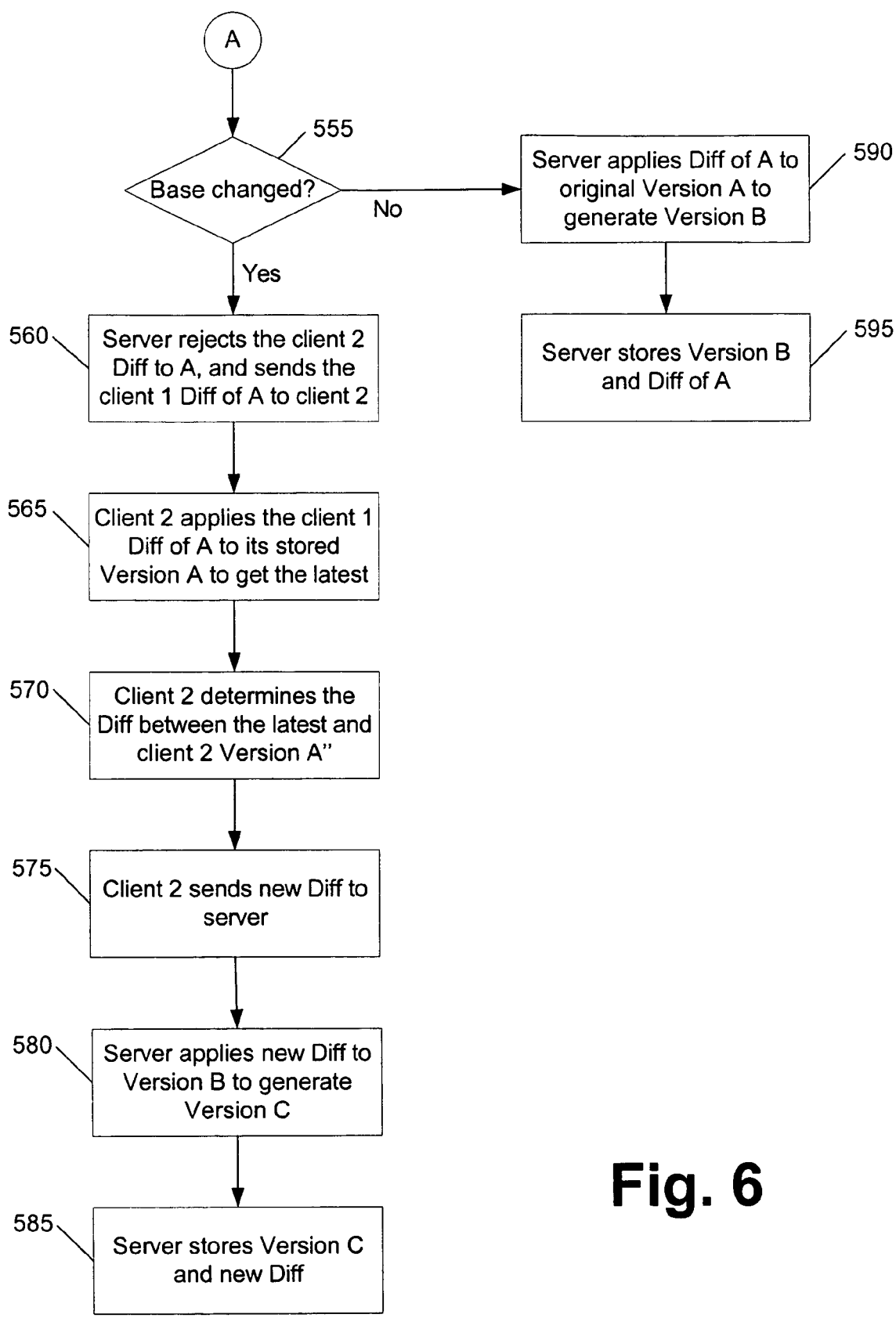

FIG. 4 shows a block diagram of an exemplary system that is helpful in describing aspects of the present invention, and FIGS. 5 and 6 show a flow diagram of an exemplary method of maintaining an updated file when two users are making changes to the same base file. In this example, assume a server 400 maintains a base file (Version A), and two clients 410, 420 (referred to herein as clients 1 and 2, respectively) both desire to make changes to the same base file.

At step 500, both client 1 and client 2 request and receive the latest version ("Version A") of the base file from the server 400 (i.e., clients 1 and 2 download the base file). It is contemplated that clients 1 and 2 can make the changes to the base file concurrently, or sequentially in time. However, only one client will be first in getting its changes to the original base file to the server. These changes are applied to the original base file. Thus, the first client who sends the difference to the server has that difference accepted by the server. A subsequent client's difference based on the base file will be rejected by the server. Therefore, the client that sends its changes to the original base file later must first receive the updated base file, and then make changes to that updated base file, as described below in more detail.

Assuming client 1 makes its changes first, the method proceeds similar to steps 200 through 260 as set forth in FIG. 2. That is, client 1 makes its changes to Version A to create a Version A', at step 505. At step 510, client 1 saves a copy of the original Version A and the new Version A'. It is contemplated that a copy of Version A can be stored at client 1 either before step 505 or after step 505. A diff (preferably, a binary diff) is then produced at step 515 by comparing Versions A and A'.

At step 520, client 1 sends the diff to the server 400. When synchronizing changes back to the server, the client verifies that the server supports the diff mechanism and then uploads the "diff", along with the version information specifying the version of the original file. The server 400, after checking to be sure that its latest version of the base file has not changed from the Version A that the client used in making the modification, applies the client 1-provided diff of Version A to generate a new, latest version of the file, Version B, at step 525.

The server stores the new Version B as well as the client 1-provided diff, at step 530. The new Version B is considered to be the latest update of the base file, and the diff is retained for use by other clients (e.g., client 2) who may be making changes to the original Version A.

Similar to steps 270 and 280, although not shown in FIG. 5, the server 400 advises client 1 of the new version identifier (e.g., "Version B"). Client 1 then discards the diff that it had determined as well as its stored Version A, and the client marks its Version A' with the new version identifier. Thus, the client renames Version A' as Version B.

Meanwhile, at step 535, client 2 modifies the original base file Version A it has received to create a new version, Version A". At step 540, client 2 saves a copy of the original Version A and the new Version A". It is contemplated that a copy of Version A can be stored at client 2 either before step 540 or after step 540. A diff is then produced at step 545 by comparing Versions A and A".

At step 550, client 2 sends its diff of Version A to the server 400. The server 400 checks to see whether the base file that it is storing has changed from the base file that client 2 has used as the basis for client 2's modifications.

If the server state of the base file has been cached in the local store associated with the requesting client, a comparison takes place between the file in the local store with the state of the corresponding file on the server. This comparison is conducted in order to determine whether the copy of the file stored in the local store is the most recent version or whether a more recent version exists at the server. In other words, the comparison addresses the possibility that another client has modified and updated the requested file since the last time that the requesting client has obtained the copy of the file. It should be noted that the comparison desirably includes the transmission of an identifier representing the state of the file, without requiring transmission of the entire file between client and server. In this manner, the comparison reduces the network traffic that might otherwise be required and avoids transmitting the same version of the file more than once.

Thus, at step 555, the server checks to be sure that its latest version of the base file has not changed from the Version A that client 2 used in making the modification. If the base file had not changed, then at step 590, the server 400 applies the client 2-provided diff to the server-stored base file to generate a new, latest version of the file, which the server stores along with the client 2-provided diff at step 595. The server 400 would advise client 2 of the new version identifier, and client 2 would then discard the diff that it had determined as well as its stored Version A, and mark its modified Version A" with the new version identifier.

However, in this example, client 1 has already provided changes to the server 400, so the base file stored at the server has changed to Version B. Client 2 does not have a copy of Version B, and made its modifications to Version A of the file. Therefore, because the base file has changed, the server 400 rejects the client 2-provided diff, at step 560, and sends client 2 the client 1-provided diff to Version A that the server 400 had earlier received and stored (at step 530).

At step 565, client 2 applies the client 1-provided diff of Version A to its stored Version A to get the latest server-stored version of the file (here, Version B). Client 2 then determines the diff between the latest version and its modified Version A", and sends the diff to the server 400, at steps 570 and 575, respectively. The server 400 applies the new diff to its stored latest version (Version B), at step 580, to generate the new, latest version (here, Version C). At step 585, the server 400 stores the new, latest version as well as the newly received diff. Similar to steps 270 and 280, although not shown in FIG. 5, the server 400 advises client 2 of the new version identifier (e.g., "Version C"). Client 2 then discards the diff that it had determined as well as its stored version, and the client marks its Version A" with the new version identifier. Thus, the client renames Version A" as Version C.

Rather than automatically saving a modified version at a server, it is contemplated that a user, such as an administrator, could determine how changes should be integrated. This may avoid content conflicts with a previous user's changes.

It is noted that the diff can be determined either before or after the server has indicated approval to accept the diff. Thus, for increased efficiency, the client may wait until the server has indicated that the client has made changes to the same version of the base file that the server is currently maintaining as the latest version. Only then would the client determine the diff and provide it to the server. Desirably, the server does not calculate the difference, and instead only applies the difference.

A situation is contemplated in which one client makes multiple uploads, before another client connects with the server to provide its changes. For example, assume the original base file is version A. Client 1 then makes changes and these changes are accepted as version B. If client 1 makes further changes and provides them to the server, this new, latest version will be saved as Version C. Desirably, the server saves the difference between Versions A and B, and the difference between Versions B and C. Thus, when another client makes its changes, the server will send the difference between Versions A and B, and the difference between Versions B and C to that client, preferably in the same message. The client then recreates Version B, then Version C, and determines the difference between Version C and its changes, and provides this difference to the server.

If an out of date client connects to the server to get the latest version, it tells the server which version it has, and if the stored diffs date back to that version, the appropriate diff or diffs are returned along with the current version ID. Preferably, the server maintains all the diffs between the various versions that it receives during processing, in order to accommodate those clients who may be still making changes to old versions (i.e., to be "backward compatible" to old versions of the base file). However, at some point, the server can delete or otherwise remove previously stored diffs that it has been maintaining. Such action may be prompted, for example, by date or storage capacity.

Desirably, HyperText Transport Protocol (HTTP) is used to transmit the diffs. In particular, protocol extensions may be used to alert the server that a diff is being transmitted or otherwise implemented or incorporated within the message.

HTTP has emerged as the standard mechanism by which information is transported over TCP/IP (Transmission Control Protocol/Internet Protocol) compatible networks, such as the Internet, intranets, and extranets. HTTP is more specifically an application-level protocol for distributed, collaborative, hypermedia information systems. It is a generic, stateless, protocol that can be used for many tasks beyond its use for hypertext, such as name servers and distributed object management systems, through extension of its request methods, error codes and headers. It is referred to as a transport protocol, because information is transported according to its specifications, and is also referred to as a request-response protocol, since information is exchanged by a client making a request of a server, which generates a response thereto. HTTP as referred to herein refers generally to any standard of HTTP, and available on the website http://www.w3.org.

A common use of HTTP is the transport of information formatted according to a markup language. For example, a popular application of the Internet is the browsing of world-wide-web pages thereof. In such instances, typically the information retrieved is in HyperText Markup Language (HTML) format, as transported according to HTTP. However, other standard markup languages are emerging. One such markup language is eXtensible Markup Language (XML). XML describes a class of data objects that are referred to as XML documents, and partially describes the behavior of computer programs that process them. A primary difference between HTML and XML is that within the former, information content is intertwined with the layout of the content, making their separation difficult, for example. Conversely, within XML a description of the storage layout and logical structure of content is maintained separate from the content itself. However, both XML and HTML are derivatives of a markup language known as Standard Generalized Markup Language (SGML). XML as referred to herein refers generally to any standard of XML, as described on the website http://www.w3.org.

To maintain backward compatibility and interoperability, for example, an extended HTTP header in an OPTIONS response may be used to allow the client to discover that the server supports binary diffs. An extended header in GET requests notifies the server that the client accepts diffs.

Either the client or the server can choose not to use the binary diff. In some cases, it may be possible that the message sending the diff (e.g., the HTTP binary diff header) will be larger than the file itself. In such a case, it may be more desirable to send the document instead of the diff between the server and the clients. The client may determine that the diff size is bigger than the new file. This can happen, for example, if the new file has 0 bytes. The server can decide to discard the diffs to save storage space. If a diff is not used, the whole file is sent. To signal when a diff is sent, the client may send the extended header(s) with its PUT request to indicate the presence of a binary diff in the body and the version number of the base file the diff is generated from. The server sends the extended header(s) with its GET response to indicate the presence of a binary diff chain, the version number of the base file, and the number of diffs in the chain.

When multiple diffs are needed to bring the client file up to date, the server can choose either to chain the diff together in a single reply or if the sum of the diff is bigger than the new version, send back the new version itself.

An engine for calculating and applying the diffs is preferably provided within the clients and/or server(s). Protocol for discovery and diff/version management is also preferably implemented. Extended HTTP headers allow the client and server to express their capability with respect to differencing. For example, the client sends the extended header(s) with its PUT request to indicate the presence of a binary diff in the body and the version number of the base file the diff is generated from. The server sends the extended header(s) with its GET response to indicate the presence of a binary diff chain, the version number of the base file, and the number of diffs in the chain.

The server code desirably is capable of managing diffs to apply (using the engine), store, and return diffs, and each client preferably has the ability to maintain server state, generate diffs, transmit diffs to server, and apply returned diffs.

Replication is broadly used by a wide variety of applications, but the cost and performance of these systems is a constant challenge. The present invention leverages the nature of replication (known client/server state) to make a major leap in efficiency of the system. The present invention can be applied to systems replicating large files that are routinely updated, such as products that allow server-based documents or files to be accessed offline.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method of maintaining an updated file, comprising:
    storing a first copy and a second copy of a base file at a first device and at a second device;
    receiving a first set of changes to the first copy at the first device and a second set of changes to the first copy at the second device;
    determining a first difference between the changed first copy and the second copy at the first device, and a second difference between the changed first copy and the second copy at the second device;
    transmitting the first difference and the second difference to a server;
    receiving the first difference or the second difference first in time at the server;
    accepting the difference received first in time at the server if the base file at the server is the same as the base file that was stored at the device associated with the difference received first in time, otherwise rejecting the difference at the server;
    rejecting the difference received second in time at the server; and
    transmitting a third difference from the server to the device associated with the difference received second in time, and applying the third difference to the second copy of the base file stored at the device.

2. The method of claim 1, further comprising receiving the first copy of the base file at the first device from the server, and making the second copy of the base file at the first device, prior to storing the first copy and the second copy of the base file at the first device.

3. The method of claim 1, wherein determining the first difference comprises using binary comparisons between the changed first copy and the second copy.

4. The method of claim 1, wherein the first difference is a binary diff.

5. The method of claim 1, wherein if the difference is rejected at the server, then transmitting an additional difference from the server to the first device, and applying the additional difference to the second copy of the base file stored at the device associated with the difference received first in time.

6. The method of claim 1, further comprising determining if the base file at the server is the same as the base file that was stored on the first device.

7. The method of claim 1, wherein transmitting the first difference comprises utilizing extensions to the HTTP protocol.

8. The method of claim 1, further comprising receiving the first copy of the base file at the second device from the server, and making the second copy of the base file at the second device, prior to storing the first copy and the second copy of the base file at the second device.

9. The method of claim 1, wherein determining the second difference comprises using binary comparisons between the changed first copy and the second copy at the second device.

10. The method of claim 1, wherein the second difference is a binary diff.

11. The method of claim 1, further comprising determining if the base file at the server is the same as the base file that was stored on the second device.

12. The method of claim 1, wherein transmitting the second difference comprises utilizing extensions to the HTTP protocol.

13. A computer-readable medium having stored thereon computer-executable instructions for performing a method of maintaining an updated file, comprising:
    storing a first copy and a second copy of a base file at a first device and at a second device;
    receiving a first set of changes to the first copy at the first device and a second set of changes to the first copy at the second device;
    determining a first difference between the changed first copy and the second copy at the first device, and a second difference between the changed first copy and the second copy at the second device;
    transmitting the first difference and the second difference to a server;
    receiving the first difference or the second difference first in time at the server;
    accepting the difference received first in time at the server if the base file at the server is the same as the base file that was stored at the device associated with the difference received first in time, otherwise rejecting the difference at the server;
    rejecting the difference received second in time at the server; and
    transmitting a third difference from the server to the device associated with the difference received second in time, and applying the third difference to the second copy of the base file stored at the device.

14. The computer-readable medium of claim 13, further comprising computer-executable instructions for receiving the first copy of the base file at the first device from the server, and making the second copy of the base file at the first device, prior to storing the first copy and the second copy of the base file at the first device.

15. The computer-readable medium of claim 13, wherein determining the first difference comprises using binary comparisons between the changed first copy and the second copy.

16. The computer-readable medium of claim 13, wherein the first difference is a binary diff.

17. The computer-readable medium of claim 13, further comprising computer-executable instructions for, if the difference is rejected at the server, transmitting an additional difference from the server to the first device, and applying the additional difference to the second copy of the base file stored at the device associated with the difference received first in time.

18. The computer-readable medium of claim 13, further comprising computer-executable instructions for determining if the base file at the server is the same as the base file that was stored on the first device.

19. The computer-readable medium of claim 13, wherein transmitting the first difference comprises utilizing extensions to the HTTP protocol.

20. The computer-readable medium of claim 13, further comprising computer-executable instructions for receiving the first copy of the base file at the second device from the server, and making the second copy of the base file at the second device, prior to storing the first copy and the second copy of the base file at the second device.

21. The computer-readable medium of claim 13, wherein determining the second difference comprises using binary comparisons between the changed first copy and the second copy at the second device.

22. The computer-readable medium of claim 13, wherein the second difference is a binary diff.

23. The computer-readable medium of claim 13, further comprising computer-executable instructions for determining if the base file at the server is the same as the base file that was stored on the second device.

24. The computer-readable medium of claim 13, wherein transmitting the second difference comprises utilizing extensions to the HTTP protocol.

* * * * *